United States Patent Office 2,836,605
Patented May 27, 1958

2,836,605

IN SITU EPOXIDATION USING ACETIC ANHYDRIDE AND A BASIC SALT

Stanley P. Rowland and Ralph G. White, Philadelphia, Pa., assignors to Rohm & Haas Company, Philadelphia, Pa., a corporation of Delaware No Drawing. Application June 9, 1954
Serial No. 435,612

18 Claims. (Cl. 260—348.5)

This invention relates to an improved process of epoxidizing esters of unsaturated fatty acids whereby epoxy groups

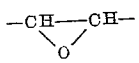

are added to the acid portion of the esters at those points originally occupied by double bonds. More particularly, it relates to a process of epoxidizing esters, especially glyceryl esters of fatty acids, especially of oleic, linoleic, and linolenic acids.

Epoxidation of such esters by means of performic acid or peracetic acid has been described heretofore, for example, in U. S. Patents 2,458,484, 2,485,160, 2,567,930 and 2,569,502 and in journal articles including an article by Greenspan and Gall (Industrial and Engineering Chemistry, vol. 45, No. 12, pp. 2722–2726 (December 1953)).

An object of this invention is to provide an economical, safe, and efficient process of epoxidizing esters of unsaturated acids with peracetic acid. Another object is to provide a process which does not require the separate formation of peracetic acid. Still another object is to provide a rapid process which yields esters—particularly the fatty acid esters of glycerol—which have high contents of oxirane-oxygen and low iodine numbers and which also have a minimum of hydroxy and acetoxy substituents.

Epoxidized esters, such as are prepared by the process of this invention, are widely used as stabilizers and plasticizers for a variety of organic plastic materials, such as polyvinyl chloride, copolymers of vinyl chloride and vinyl acetate, and chlorinated rubber.

The process of this invention comprises reacting an ester of an unsaturated fatty acid with an aqueous mixture of hydrogen peroxide, acetic anhydride, and a salt. The reaction can be carried out at temperatures from about 10° C. to the boiling point of the aqueous mixture (about 100° C.), but in commercial production it is much preferred to operate from room temperature to about 80° C.

Peracetic acid is formed in the aqueous mixture and it is believed that it is this peracetic acid which enters the organic ester phase and is responsible for the epoxidation of the double bonds in the acid moiety of the ester. The maximum amount of acetic anhydride which is used is two moles for each double bond in each mole of esterified acid. That is to say, the maximum amount of the anhydride which is employed is two moles for each mole of unsaturation in the fatty acid ester. According to the best practice, however, it is much preferred to employ less than this amount for each mole of unsaturation. Amounts of acetic anhydride as low as 0.6 mole per mole of unsaturation have been employed successfully. When such considerations as economy and efficiency of epoxidation are taken into account, it is much preferred that the quantity of acetic anhydride which is employed be from about 0.8 to about 1.2 moles for each double bond in each mole of the ester being epoxidized.

The amount of hydrogen peroxide which is employed should be at least one mole for each double bond in each mole of esterified acid. This minimum amount of hydrogen peroxide is required because the peroxide is the ultimate source of the oxygen atom which forms the three-membered epoxide group or oxirane ring with the two carbon atoms joined by the original double bond. Thus, for example, in the epoxidation of an oleic acid ester of a monohydric alcohol one mole of hydrogen peroxide is required for complete epoxidation since there is one double bond in the ester or, expressed another way, since there is one mole of unsaturation. Furthermore, two moles of hydrogen peroxide are required to epoxidize completely one mole of a linoleic ester of a monohydric alcohol because linoleic acid contains two double bonds. The same minimum amount, two moles, is needed to epoxidize one mole of an oleic ester of a dihydric alcohol. Ordinarily, an excess of hydrogen peroxide is employed. Such an excess facilitates the course of reaction. An excess of about 0.1 mole over the minimum of one mole, which is required by theory, is usually adequate but the excess may be as much as a full mole, thus making the recommended ratio of peroxide from one to two moles per mole of unsaturation. Commercial grades of hydrogen peroxide, containing preferably 50% to 90% peroxide are used. The more concentrated solutions of hydrogen peroxide are used at the lower temperatures and the more dilute solutions at the higher temperatures.

In this process, as is indicated above, the epoxidation reaction is catalyzed by the presence of a salt. The salts which are employed are those which are substantially neutral or basic in aqueous solution. That is, the operable salts are those whose aqueous solutions or dispersions have a pH value of at least six, and preferably a value above seven. Typical salts which have been used successfully include the following: the acetates of sodium, potassium, lithium, calcium, barium and zinc; the sulfates of sodium, potassium, and lithium; the chlorides of sodium and potassium; the nitrates of sodium, potassium, lithium, calcium and barium; the phosphates of sodium and potassium as well as disodium hydrogen phosphate and dipotassium hydrogen phosphate; the bromides and fluorides of sodium and potassium; the borates and fluoroborates of sodium and potassium; and the formates, oxalates, tartrates, citrates and chloroacetates of the alkali metals. The hydroxides, oxides, carbonates and bicarbonates of the metals of groups I and II of the periodic table can likewise be employed, if desired, since these react with the acetic acid present in the reaction mixture to form the corresponding acetates. Other salts such as the nitrites and sufites of the alkali metals and alkaline earth metals can be employed but it is evident that these would be oxidized to the corresponding nitrates and sulfates and thereby consume some of the hydrogen peroxide. It has also been found that cation-exchange resins in the salt form can also be used effectively, even though they are insoluble. Cation-exchange resins containing carboxylate groups as their functional groups are preferred, although successful use has also been made of cation-exchange resins in which the functional groups were sulfonate groups. It is preferred that the cation-exchange resin be in the form of a salt of an alkali metal. Salts of heavy metals such as iron, lead, mercury, vanadium, cobalt and nickel which catalyze the decomposition of hydrogen peroxide are of course to be avoided. What is required is an ionizable salt of the metals of groups I and II which when present in water imparts a pH of at least six—and preferably over seven.

Since the function of the salt is to catalyze or accelerate the rate of the epoxidation reaction, it should be used in catalytic amounts; i. e., in amounts which bring about the desired speed in the reaction. The salt should be present in a ratio of at least 0.5% based on the weight of the peroxide as $H_2O_2$. Larger amounts of the order of about 3% to about 7% are preferred because these amounts have a real catalytic effect without causing the reaction to get out of control. In practice, particularly on a large industrial scale, the amount of catalyst is regulated by the amount of heat which is generated as the exothermic, epoxidation reaction progresses. That amount of catalyst is used which accelerates the reaction without causing the temperature to exceed the desired limit, which limit is never over 100° C., is ordinarily below 80° C., and is frequently about room temperature. As much as 20% sodium acetate based on the weight of the hydrogen peroxide, as $H_2O_2$, has been used but this relatively large amount had no really significant advantage over 5% to 10%.

The process of this invention applies to the esters of water-insoluble, aliphatic, unsaturated acids and it is particularly suitable for the epoxidation of the esters of those fatty acids which occur in natural vegetable oils. The most important of the fatty acids are oleic, linoleic and linolenic acids. The esters which are epoxidized by the process of this invention are those of the monohydric and polyhydric alcohols typified by the following: mono-, di-, and tri-substituted carbinols, such as ethyl, isopropyl, n-butyl, sec-butyl, tert-butyl, tert-amyl, n-octyl, 2-ethyl-hexyl, octadecyl, lauryl, cyclohexyl and benzyl alcohols; polyhydric alcohols such as ethylene glycol, 1,2-propylene glycol, 2-ethylhexandiol-1,3, butandiol-1,2; butandiol-1,3, butandiol-1,4, dodecandiol-1,12; polyalkylene glycols such as di- and tri-ethylene glycols; glycerol; pentaerythritol; and the isomers and homologues of the above. Esters of a mixture of alcohols are likewise readily epoxidized by this process such as mixtures of ethyl oleate and butyl oleate, or of benzyl linoleate and cyclohexyl linoleate, or of octyl oleate and dodecyl linoleate, or of octyl linolenate and dodecyl linolenate, et cetera. Not only are mixtures of esters operable in the process of this invention but mixed esters of the acids may also be used and converted to epoxidized materials. Semi-drying and drying vegetable oils are examples of naturally occurring mixed glyceryl esters of oleic, linoleic and linolenic acids which can be most advantageously epoxidized. The semi-drying oils are essentially mixed glyceryl esters of oleic, linoleic and saturated monocarboxylic acids, notably stearic acid, and when these are epoxidized according to the instant process, the double bonds in the glycerol-esterified oleic and linoleic acids are converted to epoxide groups; and the presence of the esterified saturated acids has no apparent effect on the course of the epoxidation reaction. Drying oils contain, in addition to esterified oleic and linoleic acid, triply-unsaturated esterified linolenic acid. Such oils are also included within the scope of this invention. Vegetable oils which have been successfully epoxidized by the instant process include the following: soybean, corn, cottonseed, safflower, sunflower, sesame, poppyseed, walnut, peanut, linseed and perrilla oils.

The average amount of unsaturation in vegetable oils which determines the amount of peroxide and acetic anhydride to be used is ordinarily known or can be readily determined by standard methods, such as a determination of the bromine-number or the iodine-number. The esters of substituted alcohols, such as the esters of polyalkylene glycols—particularly polyethylene glycols—which contain only inert substituents and which are not reactive with the aqueous peroxidic mixture, may be epoxidized by this process. Esters of aromatic alcohols, such as benzyl alcohol, which are free of aliphatic or non-benzenoid unsaturation are also included within the scope of this invention. The preferred class of esters, however, which are operable herein are those in which the alcohol moiety is that of an unsubstituted and aliphatically saturated alcohol; viz., the alkanols, alkandiols, alkantriols, and alkantetrols.

The process of this invention has been applied equally well to the epoxidation of esters of unsaturated acids other than oleic, linoleic and linolenic acids. It is a particularly effective process for the epoxidation of esters of water-insoluble, unsaturated, aliphatic acids including the following: undecylenic, myristolenic, palmitolenic, petroselic and erucic acids.

In the process of this invention, the ester to be epoxidized is charged to a reactor equipped with an agitator, cooling and heating means, a temperature recorder and a reflux condenser. The hydrogen peroxide, salt and acetic anhydride are then added to the vigorously stirred ester. Preferably the three reactants are added separately but simultaneously in the proper ratios. They are added at such a rate that the resultant exothermic reaction does not raise the temperature beyond the desired limit. Cooling means can, of course, be applied to control the temperature as in other exothermic chemical reactions. Alternatively the salt and acetic anhydride can be premixed. It is inadvisable to premix the acetic anhydride and hydrogen peroxide. The reactants can be added continuously but it is preferred to add portions of each at fairly regular intervals as dictated by the extent of the exothermic reaction. In still another modification of the process, all of the acetic anhydride is added to the ester and the salt and hydrogen peroxide are then added at the proper rate either continuously or portion-wise, in which case the reaction is controlled by the rate of addition of the peroxide and salt. After the reactants have all been added, the stirred mixture is maintained at a convenient temperature within the range of 10° C. to 100° C.—or preferably within the range of room temperature to 80° C.—until the epoxidation reaction is substantially complete. The reaction mixture—preferably at room temperature is next separated into an aqueous phase and an organic phase, the latter being the epoxidized ester. The rate of separation can be greatly increased by the addition of a water-immiscible liquid which is a solvent for the epoxidized ester. An organic liquid such as toluene is good for this purpose. The separated organic phase is washed thoroughly with a neutralizing solution such as a solution of sodium bicarbonate, and then with water, and is stripped by distillation of any organic liquid which may be present.

When the proper amounts of all of the reactants are added, the aqueous phase of the reaction mixture has a pH between 0.5 and about 4.0. At a pH below 0.5 the rate of reaction is very slow and undesirable side-reactions take place. As the reaction progresses to completion, the pH ordinarily rises so that there is no difficulty in maintaining a sufficiently high pH if the pH of the aqueous mixture of all the reactants is originally at a pH value of at least 0.5 and preferably at a value of at least 1.0.

The following examples, in which all parts are by weight unless otherwise indicated, serve to illustrate the process of this invention as applied to typical unsaturated esters.

*Example 1*

The following procedure was carried out several times in order to demonstrate the advantage of employing salts as catalysts: Into a reactor equipped with thermometer, agitator, reflux condenser and cooling means there was charged 470 parts of soybean oil. This amount was essentially equivalent to 2.5 moles of unsaturation. To the stirred oil at room temperature was added in ten equal portions at intervals of 15–20 minutes 132 parts of a 90% aqueous solution of hydrogen peroxide (equivalent to 3.5 moles), 255 parts of acetic anhydride (equivalent to 2.5 moles) and a salt in the amount shown in the tabulation below. The acetic anhydride was added separately but the salt was pre-mixed with the solution of hydrogen peroxide. The temperature was maintained at 25° to 30° C. throughout. Samples of the reaction mixture were removed at various intervals, were worked in the same manner as the finished product described below, and were tested for pH, oxirane-oxygen content and iodine number. The reaction was carried on for a total of five to eight hours. Then the reaction mixture was treated with approximately one-half its volume of toluene and the organic phase containing the epoxidized oil was separated, was washed first with one-half its volume of a 10% aqueous solution of sodium bicarbonate to neutrality and then was washed three times with approximately one-half its volume of water each time. The organic liquid was then distilled up to 100° C. at 1 mm. of pressure.

Following is a tabulation of the kind and amounts of salts employed together with the measurements of pH of the aqueous phase of the reaction mixtures, the oxirane oxygen-contents, and iodine numbers of the products. The amounts of salts are expressed as percentage of the amount of hydrogen peroxide as $H_2O_2$ and the oxirane oxygen-contents are those obtained in the number of hours shown on the right of the diagonal.

| Salt Catalyst | Percent Salt | pH's | | | Percent Oxirane Oxygen | Iodine Number |
|---|---|---|---|---|---|---|
| | | 2.75 hr. | 5 hr. | 8 hr. | | |
| "Blank" | None | <0 | <0 | ca. 0.5 | 3.8/8 hrs | 33.0 |
| NaOCOCH₃ | 1.1 | 1.42 | 1.8 | | 5.7/8 hrs | 5.7 |
| NaOCOCH₃ | 4.4 | 2.25 | 2.4 | | 6.0/5 hrs | 7.5 |
| NaOCOCH₃ | 10.5 | 2.64 | 2.75 | 2.88 | 6.0/5 hrs | 6.8 |
| NaOCOCH₃ | 21 | 3.18 | 3.22 | 3.25 | 6.1/5 hrs | 7.2 |
| NaOCOH | 1.1 | 1.45 | 1.80 | | 5.6/8 hrs | 2.7 |
| K₂SO₄ | 10.5 | 0.9 | 1.45 | | 5.1/8 hrs | 15 |
| KNO₃ | 10.5 | 1.35 | 2.22 | 2.62 | 5.6/8 hrs | 3.4 |
| Borax | 10.5 | 1.12 | | 2.21 | 5.8/5 hrs | 5.4 |
| Na₂HPO₄ | 10.5 | 2.32 | 2.98 | | 5.8/5 hrs | 3.2 |
| KCl | 10.5 | 2.85 | 3.67 | | 5.3/5 hrs | 4.3 |
| IX-Resin [1] | 18.3 | 2.15 | | 2.42 | 6.1/8 hrs | 3.4 |

"IX-Resin" indicates an ion-exchange resin known to be a cross-linked copolymer of acrylic acid and divinylbenzene. It was in the form of the sodium salt.

The advantage of using a salt catalyst is evident from a comparison of the values for oxirane oxygen and the iodine numbers of the various products with those of the "blank."

*Example 2*

Into a reactor equipped as above described was charged 663 parts of cottonseed oil and an equal volume of toluene. The solution was heated to 70° C. To this was added slowly but continuously over a period of 2.25 hours 306 parts of acetic anhydride. Also a mixture of 11.4 parts of sodium nitrate and 11.4 parts of sodium acetate was added in three equal portions, one at the beginning of the run, the second after an hour, and the third portion at the end of the second hour. A total of 286 parts of a 50% aqueous solution of hydrogen peroxide was added in 10 equal portions, the first at the beginning of the run and the other nine at about 15-minute intervals. The temperature was maintained at 70° to 75° C. throughout a total period of three hours. The product was isolated in the manner described in Example 1 above and was found to have an oxirane oxygen-content of 4.83% and an iodine number of 0.9.

In a duplicate run in which the salt catalysts were omitted, the product had an oxirane oxygen-content of 3.12% and an iodine number of 36.

*Example 3*

The procedure of Example 1 was followed here except that safflower was epoxidized. A total of 526 parts of safflower oil, 30.1 parts of sodium acetate, 306 parts of acetic anhydride, and 158.5 parts of a 90% aqueous solution of hydrogen peroxide were reacted for a total of eight hours at 25°-35° C. The pH values measured at 2.75 hours, 5 hours and 8 hours were 3.18, 3.22 and 3.25 respectively. The product, isolated in the above-described manner, had an oxirane oxygen-content of 6.38% and an iodine number of 3.2.

Currently the greatest commercial demand for epoxy compounds is for epoxidized oils for use in vinyl resin compositions. Another class of epoxides which is finding increased utility in vinyl resin compositions, where they serve as stabilizers and plasticizers, are alkyl epoxystearates which are best made by the epoxidation of alkyl oleates. The instant process is eminently suitable for the preparation, particularly on a large and efficient scale, of both of these preferred classes of epoxy esters because it is a rapid method and produces materials which are high in oxirane oxygen-content and have little residual unsaturation. The following example illustrates the preparation of alkyl epoxystearates by the process of this invention.

*Example 4*

The same kind of equipment described above was employed in this instance; and the same general procedure of Example 1 was followed. Thus 1088 parts of hexyl oleate was reacted with 15 parts of potassium nitrate, 306 parts of acetic anhydride and 158.5 parts of a 90% aqueous solution of hydrogen peroxide. The temperature was held at 25°-35° C. and the total running time was eight hours. The pH of the aqueous phase was 1.35 at 2.75 hours, 2.22 at five hours, and 2.62 after eight hours. The product had an oxirane oxygen-content of 3.61% and an iodine number of 6.7 after five hours. After eight hours the values were 3.81% and 1.8.

We claim:

1. A process for the in situ epoxidation of an ester of a water-insoluble unsaturated aliphatic acid which comprises reacting by mixing together at a temperature from about 10° C. to the boiling point of the reaction mixture said ester with an aqueous mixture having a pH from about 0.5 to about 4.0 and said aqueous mixture being formed from hydrogen peroxide, acetic anhydride and as a catalyst a salt of the alkali metals and alkaline earth metals which when present in water imparts thereto a pH of at least 6.0, said hydrogen peroxide being present in an amount equivalent to at least one mole for each double bond in each mole of said ester, and said acetic anhydride being present in an amount equivalent to about 0.6 to 2 moles for each double bond in each mole of said ester and said salt being present in an amount equal to at least 0.5% based on the weight of said hydrogen peroxide.

2. The process of claim 1 in which said ester is an alkyl oleate.

3. The process of claim 2 in which said alkyl oleate is hexyl oleate.

4. The process of claim 1 in which said ester is a vegetable oil.

5. The process of claim 4 in which said vegetable oil is cottonseed oil.

6. The process of claim 4 in which said vegetable oil is safflower oil.

7. The process of claim 4 in which said vegetable oil is soybean oil.

8. The process of claim 7 in which said salt is sodium acetate.

9. The process of claim 7 in which said salt is an alkali metal salt of a cation-exchange resin.

10. A process for the in situ epoxidation of an ester of a water-insoluble unsaturated aliphatic acid which comprises reacting by mixing together at a temperature from about room temperature to about 80° C. said ester with an aqueous mixture having a pH from about 0.5 to about 4.0 and said aqueous mixture being formed from hydrogen peroxide, acetic anhydride and as a catalyst a salt of the alkali metals and alkaline earth metals which when present in water imparts thereto a pH of at least 6.0, said hydrogen peroxide being present in an amount equivalent to at least one mole for each double bond in each mole of said ester, and said acetic anhydride being present in an amount equivalent to about 0.8 to 1.2 moles for each double bond in each mole of said ester, and said salt being present in an amount equal to about 3% to about 8% based on the weight of said hydrogen peroxide.

11. The process of claim 10 in which said ester is an alkyl oleate.

12. The process of claim 11 in which said alkyl oleate is hexyl oleate.

13. The process of claim 10 in which said ester is a vegetable oil.

14. The process of claim 13 in which said vegetable oil is cottonseed oil.

15. The process of claim 13 in which said vegetable oil is safflower oil.

16. The process of claim 13 in which said vegetable oil is soybean oil.

17. The process of claim 16 in which said salt is sodium acetate.

18. The process of claim 16 in which said salt is an alkali metal salt of a cation-exchange resin.

References Cited in the file of this patent

UNITED STATES PATENTS

| | | |
|---|---|---|
| 2,312,535 | Fieser | Mar. 2, 1943 |
| 2,347,434 | Reichert et al. | Apr. 25, 1944 |
| 2,377,038 | Reichert | May 29, 1945 |
| 2,458,484 | Terry et al. | Jan. 4, 1949 |
| 2,485,160 | Niederhauser | Oct. 18, 1949 |
| 2,583,569 | Herzfeld | Jan. 29, 1952 |
| 2,692,271 | Greenspan | Oct. 19, 1954 |

OTHER REFERENCES

Du Pont Electrochemicals Dept. Peroxygen Products Bulletin #P61–454 (published April 1954).

Swern: Chem. Reviews 45: 3–9 (1949).